INVENTOR.
HANS VOLLAND
BY Michael S. Striker
ATTORNEY

May 5, 1964 H. VOLLAND 3,131,433
INJECTION MOLDING MACHINE
Filed Nov. 8, 1961 2 Sheets-Sheet 2

INVENTOR:
HANS VOLLAND
BY
Michael S. Striker
ATTORNEY

United States Patent Office 3,131,433
Patented May 5, 1964

3,131,433
INJECTION MOLDING MACHINE
Hans Volland, Erlangen-Bruck, Germany, assignor to
Max Grundig, Furth, Upper Bavaria, Germany
Filed Nov. 8, 1961, Ser. No. 154,096
Claims priority, application Germany Mar. 3, 1959
32 Claims. (Cl. 18—30)

The present invention relates to injection molding machines for thermoplastic materials, and more particularly to an injection molding machine whose material conveying element, such as a plunger or a screw, is provided with an arrangement adapted to eliminate reflux (i.e. backflow) of thermoplastic material in a direction away from the mold.

This application is a continuation-in-part of my application Serial No. 12,103, now abandoned.

The elimination of reflux or backflow in injection molding machines of presently utilized design constitutes a very serious problem which is felt in machines operating with an injection plunger as well as in those which utilize conveying elements in the form of screws. It is difficult to properly seal an injection plunger against the internal surface of its cylinder and another, often equally serious, drawback of such machines is that the plunger seldom expels the last traces of conveyed thermoplastic material; this is particularly undesirable when the subsequently processed batches of thermoplastic material contain differently colored substances or substances which attack or are attacked by the substances contained in previously treated thermoplastic material. In such instances, the machine must be taken apart in its entirety, and all component parts must be thoroughly cleaned before a different thermoplastic material may be introduced into the cylinder. While an injection plunger will normally produce the pressure necessary for carrying out an injection molding operation, presently utilized screw conveyors cannot always meet such requirements though their plasticizing action is superior to that of injection plungers.

An important object of the present invention is to provide a system which positively prevents any reflux of thermoplastic material in an injection cylinder and which is of such construction that it may be readily incorporated in an injection molding machine utilizing a plunger or a conveyor screw.

Another important object of the invention is to provide a reflux eliminating member which is constructed and assembled with the material conveying element and with the cylinder of an injection molding machine in such a way that the conveying element need not be removed from its cylinder if an inspection, exchange or replacement of the reflux eliminating member becomes necessary.

A further object of the instant invention is to provide an annular member which prevents any reflux of thermoplastic material in the cylinder of an injection molding machine, and which is constructed and assembled with the material conveying plunger or screw in such a way as to prevent or to substantially reduce accumulation of non-injected material in the cylinder upon completion of a molding operation.

A concomitant object of my invention is to provide a reflux eliminating member of the above outlined character which may be produced and installed at a very low cost and which may be utilized in many injection molding machines of presently known design without necessitating substantial modifications in the construction of such machines.

With the above objects in view, the invention resides in the provision of an injection molding machine whose cylinder and material conveying element define between themselves an annular path for thermoplastic material, and which comprises a reflux eliminating annular member adapted to reciprocate in the aforementioned path between a rearmost position in which it prevents the flow of thermoplastic material and a foremost position in which it permits the thermoplastic material to flow in a direction toward the mold. At least that portion of the annular member which is adjacent to its front and/or rear end, as seen in the direction of material flow through the cylinder, is preferably of reduced thickness or is configurated in such a way that it may expand into sealing engagement with the internal surface of the cylinder under the back pressure of conveyed thermoplastic material when the annular member assumes its rearmost position whereby any reflux and/or bleeding of thermoplastic material about the annular member is prevented.

It is preferred to provide the conveying element with a pair of stop means located at the forward and rear ends of the aforementioned passage and preferably having oppositely inclined stop faces, and to provide similarly inclined end faces on the annular member, one end face of the annular member always abutting against the complementary stop face when the annular member assumes its foremost or rearmost position. The internal surface of the annular member defines with the conveying element one or more ducts for the flow of thermoplastic material, and the depth of the ducts preferably increases in radial direction from the rear to the front end face of the annular member. The ducts lend a certain amount of elasticity to the annular member so that the latter may expand into sealing contact with the internal surface of the cylinder when the back pressure of conveyed thermoplastic material reaches a given magnitude.

The conical stop faces may be provided on integral component parts of the conveying element or on parts which are releasably connected thereto.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

Figure 1:
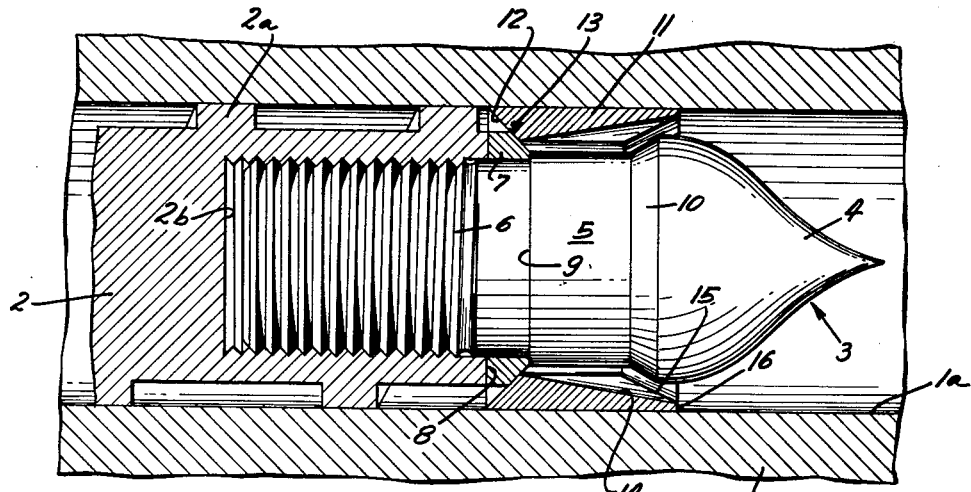
FIG. 1 is an axial section through the cylinder and through the conveying element of an injection molding machine embodying one form of my invention, according to which the reflux eliminating arrangement comprises an axially movable annular member and an annulus which is retained by the separable head of the conveying element at the upstream side of the annular member.
Figure 2:
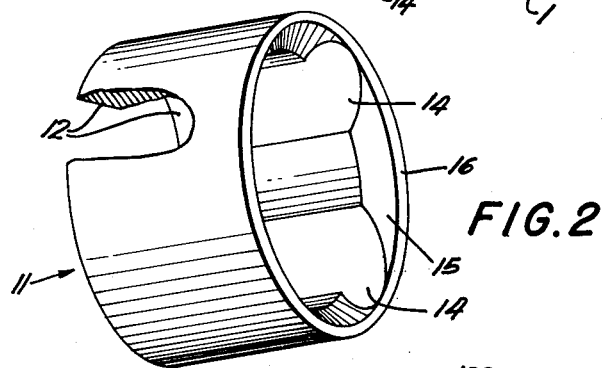
FIG. 2 is a perspective view of the annular member whose internal surface is formed with a series of ducts through which the thermoplastic material may flow toward the mold.

Referring now in greater detail to the illustrated embodiments, and first to FIG. 1, there is shown a cylinder 1 which constitutes a component part of an injection molding machine. The bore 1a which is bounded by the internal surface of the cylinder 1 receives an axially and angularly movable material conveying element 2 here shown as a screw with helical threads 2a. The forward end of the screw 2 carries a removable head 3 which terminates in a pointed, preferably bulbose forward portion 4. This bulbose portion is integral with a constant-diameter cylindrical median portion 5, the latter having a smaller-diameter externally threaded rearwardly projecting extension 6 which constitutes the rear end portion of the head and which is screwed into the coaxial tapped blind bore 2b formed at the forward end of the screw 2. A stop means in the form of an annulus 7 is retained between the radially extending forward end face 8 of the screw 2 and a rearwardly facing radial shoulder 9 provided at the rear end of the median portion 5. The outer diameter of the annulus 7 equals the outer diameter of the screw 2, and its conical stop face 13 tapers inwardly in the direction of material flow to terminate at the shoulder 9. The abutment between the shoulder 9 and the annulus 7 is such that thermoplastic material normally cannot accumulate therebetween. The median portion 5 extends between the shoulder 9 and the rearwardly and inwardly tapering conical stop face 10 of the bulbose forward portion 4. The median portion 5 defines with the internal surface of the cylinder 1 an annular path for thermoplastic material and is loosely surrounded by a reflux eliminating annular member 11 which is shown in greater detail in FIG. 2. The outer diameter of the annular member 11 approximates the diameter of the bore 1a, there being usually an annular clearance of about 0.05 mm. between the parts 1 and 11. The rear end of the annular member 11 is bounded by an inwardly and forwardly inclined conical end face 12 whose innermost portion overlaps the outermost portion of the conical stop face 13 on the annulus 7. Thus, when the annular member 11 assumes its rearmost position in which the conical faces 12, 13 abut against each other, the member 11 and the annulus 7 form a tight seal between the head 3 and the cylinder 1 to prevent any flow of thermoplastic material in either direction, such abutment of the annulus 7 with the member 11 being brought about by thermoplastic material surrounding the bulbose forward portion 4 when the screw 2 advances or tends to advance in forward direction and the pressure of thermoplastic material accumulated about the bulbose portion 4 exceeds the pressure of material filling the bore 1a at the upstream side of the annulus 7.

The forward end of the reflux eliminating annular member 11 is bounded by a radially extending end face 16 and by a rearwardly and inwardly tapering conical end face 15 whose inclination preferably corresponds to the inclination of the front stop face 10 on the bulbose forward portion 4. The distance between the conical stop faces 10, 13 exceeds the distance between the conical end faces 12, 15 of the annular member 11, i.e. the latter has limited freedom of axial movement in the bore 1a between the forward portion 4 and the annulus 7. Thus, the parts 4 and 7 constitute stop means for locating the annular member 11 in its foremost and rearmost positions. When the pressure of thermoplastic material conveyed by the threads of the screw 2 exceeds the back pressure of thermoplastic material located at the downstream side of the annular member 11, the latter is axially displaced in the direction of material flow to assume its foremost position in which its inclined front end face 15 abuts against the front stop face 10; the material is then free to flow through one or more ducts in the form of cutouts 14 provided in the internal surface of the annular member 11 and extending between the conical rear end face 12 and the radial front face 16. The annular member 11 may be provided with, say, four uniformly spaced ducts 14, and FIG. 1 shows that the depth of each of these ducts may increase radially outwardly at a uniform rate in a direction from the rear end toward the forward end of the annular member 11. Thus, when in the foremost position of abutment with the forward portion 4, the annular member 11 permits the thermoplastic material advanced by the threads 2a of the conveying element 2 to flow through the annular clearance formed between the spaced conical faces 12, 13, about the median portion 5 and through the ducts 14 into the cylinder space surrounding the bulbose forward portion 4. The gradually deepening ducts 14 improve the flow of thermoplastic material toward the bulbose portion 4 and greatly reduce or prevent the accumulation of material between the parts 4 and 7. Care should be taken to design all parts in the cylinder 1 in such a way as to prevent the formation of dead corners which would accumulate remnants of conveyed thermoplastic material. The arrangement of ducts 14 is preferably symmetrical, i.e. they are normally equidistant from each other and their discharge ends extend radially outwardly beyond the front stop face 10. An additional important function of the ducts 14 is that they permit elastic deformation of the annular member 11, i.e. the latter will be expanded into sealing contact with the cylinder 1 in response to increasing back pressure of conveyed thermoplastic material in the ducts 14 and will prevent bleeding of material along the internal surface of the cylinder in either direction. Additional outwardly oriented radial forces act between the conical stop face 13 of the annulus 7 and the conical rear end face 12 of the annular member 11; these radial forces also tend to expand the annular member into perfect sealing engagement with the internal surface of the cylinder 1. In other words, the annulus 7 cooperates with the member 11 to prevent the thermoplastic material from flowing through the interior of the annular member and also to prevent any bleeding of material about the periphery of this annular member.

FIG. 1 shows that the depth of the ducts 14 at the conical rear end face 12 of the annular member 11 equals zero. It is equally possible to extend the intake ends of the ducts 14 into the end face 12 in the same manner as but not to the same extent to which the discharge ends of these ducts extend into the conical front end face 15; however, the intake end of each duct 14 must be completely sealed by the conical stop face 13 of the annulus 7 when the latter abuts against the annular member 11. Otherwise, no sealing action could take place between the annulus 7 and the member 11.

The bulbose forward end portion 4 of the head 3 insures a better flow of thermoplastic material toward the mold which is located at the downstream side of the head. In addition, and as described hereinabove, the conical face 10 of the bulbose portion 4 constitutes a stop by limiting the forward axial movements of the annular member 11. This stop face 10 abuts against the inclined front end face 15 whose overall area is reduced by the discharge ends of the ducts 14.

The annular member 11 preferably consists of a hardened spring steel, but it may be made of any other suitable hard, elastic metallic or synthetic plastic material. Owing to its specific configuration (inclined end faces 12, 15 and ducts 14), and owing to its elasticity, the annular member 11 permits very satisfactory flow of thermoplastic material in forward direction but, together with the annulus 7, positively prevents any reflux of thermoplastic material along the internal surface of the cylinder 1 or along the head of the screw 2, i.e. it can satisfactorily seal the regular path for thermoplastic material as well as the small but normally present clearance between its periphery and the internal surface of the cylinder. The sealing action of the annular member 11 is fully automatic and improves at the same rate at which the back pressure of thermoplastic material increases, this being due in part to the provision of preferably gradually deepening ducts 14 and in part to the radially expanding action which the annulus 7 exerts upon the member 11. It can be said that the reflux eliminating annular member 11 is reciprocable between the oppositely inclined conical stop faces 13, 10 of two stop means 7, 4 and that, owing to the fact that the ducts 14 do not or extend only slightly into its rear end face 12, its abutment with the stop means 7 prevents the flow of material while its abutment with the front stop means 4 cannot prevent the material from flowing through the discharge ends of the ducts 14. The number of ducts may vary anywhere between one and four or even more.

Figure 3:
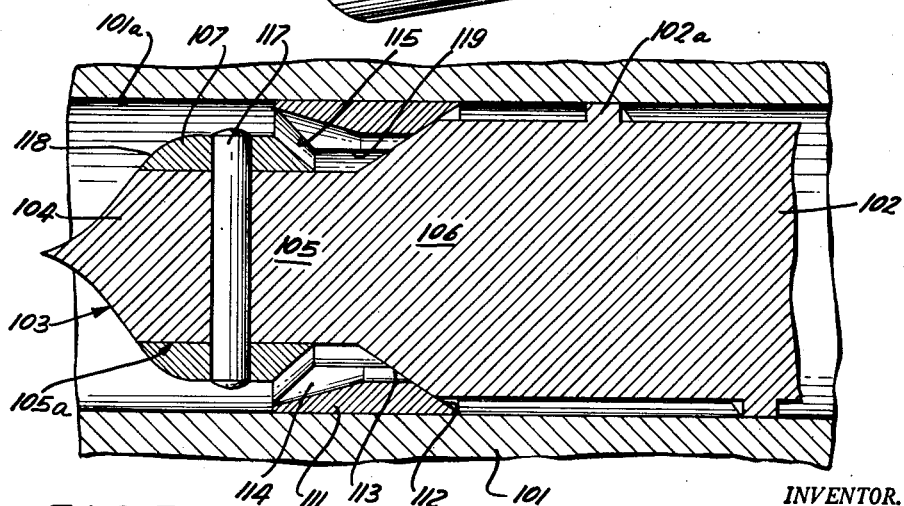
FIG. 3 is a longitudinal section through a cylinder and through a differently shaped conveying element with an integrally formed head and with a slightly modified reflux eliminating arrangement comprising an axially movable annular member and a ring member which is secured to the head of the conveying element at the downstream side of the annular member.

FIG. 3 illustrates a portion of a modified injection molding machine which comprises a cylinder 101 having a bore 101a for a material conveying element in the form of a screw 102. The latter is integrally formed with a head 103 which terminates in a pointed forward end portion 104. Adjacent to the portion 104, the head comprises a median portion 105 which is assumed to be of circular cross section though it is equally possible to form the head with a polygonal (e.g. square) median portion or to impart to this portion the shape of a cone which tapers inwardly, i.e. to the axis of the cylinder 101, in a direction toward the pointed forward end portion 104. The median portion 105 is adjacent to a conical rear portion 106 of the head 103, and the portion 106 is provided with a conical stop face 113 which tapers forwardly and inwardly toward the axis of the cylinder 101. The conveying element 102 is formed with customary helical threads 102a which advance the thermoplastic material in a direction toward the head 103. The peripheral surface 105a of the median portion 105 is sealingly surrounded by a stop means in the form of a ring member 107 which is secured thereto by one or more transverse set pins 117. The front part 118 of the ring member 107 is curved in such a way that it forms a smooth transition into the outer side of the pointed forward end portion 104. It is preferred to shape the forward end portion 104 and the ring member 107 in such a way that they form a composite bulb similar in shape to the portion 4 of the head 3 shown in FIG. 1.

The conical rear stop face 110 of the ring member 107 tapers inwardly and rearwardly toward the peripheral surface 105a of the median portion 105 and is spaced from the conical rear stop face 113. The reflux eliminating annular member 111 is received in the bore 101a between the oppositely inclined stop faces 113, 110 and has limited freedom of axial movement therebetween. At least a portion of the annular member 111 tapers outwardly in the direction of material flow or, and as shown in FIG. 3, the member 111 may be provided with several preferably uniformly spaced ducts 114 whose depth increases radially outwardly in a direction toward the stop face 110. The rear end face 112 of the member 111 is of conical shape and tapers inwardly and forwardly in the direction of material flow; its inclination preferably equals the inclination of the conical stop face 113. The front end face 115 of the member 111 is also conical but its inclination is opposite to that of the end face 112 so that it may abut against the conical stop face 110 of the ring member 107.

FIG. 3 shows the annular member 111 in sealing or rearmost position in which its rear end face 112 cooperates with the stop face 113 to prevent any flow of thermoplastic material in either direction. The ducts 114 enable the thermoplastic material to expand the annular member 111 into firm sealing contact with the internal surface of the cylinder 101 so as to prevent any bleeding of material along the wall bounding the bore 101a. When it assumes its foremost position, i.e. when its front end face 115 abuts against stop face 110 of the ring member 107, the annular member 111 permits thermoplastic material to flow through its bore 119 and through the ducts 114 formed by the surface 105a of the median portion 105 and the internal surface of the member 111, the material flowing in a direction toward the forward end portion 104. For example, the member 111 may be formed with four symmetrically arranged ducts 114 whose discharge ends extend radially outwardly and beyond the ring member 107 so that the latter cannot prevent the material from flowing to the mold when the annular member 111 is spaced from the rear stop face 113.

An advantage of the construction shown in FIG. 3 over the construction of FIG. 1 is that it facilitates more convenient cleaning of the head 103 without requiring a separation of the head from the conveying element 102. All that is necessary is to remove the pin or pins 117 and the ring member 107, whereupon the annular member 111 may be withdrawn through the forward end of the cylinder 111.

It will be readily understood that the screw 2 or 102 may be replaced by a plunger without requiring any alterations in the construction of the reflux eliminating annular member.

Figure 4:
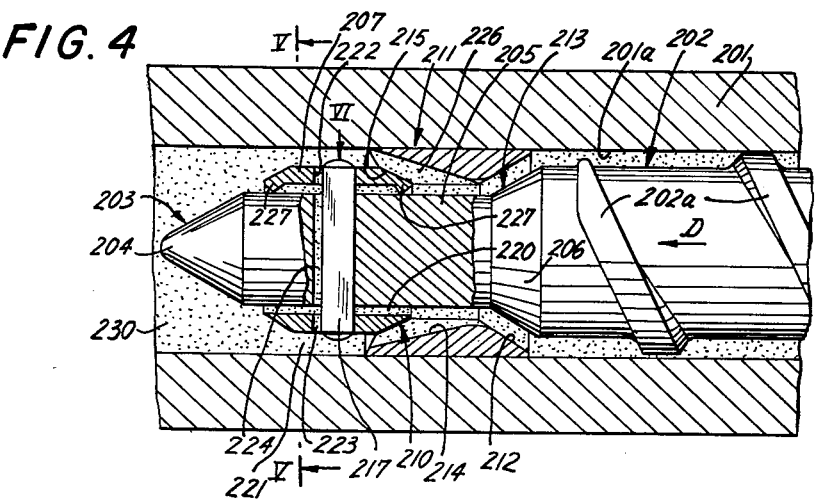
FIG. 4 is a longitudinal central section through a third embodiment of the injection molding machine wherein the front stop means assumes the form of a retaining ring which surrounds the material conveying element and defines an annular passage therewith.
Figure 5:
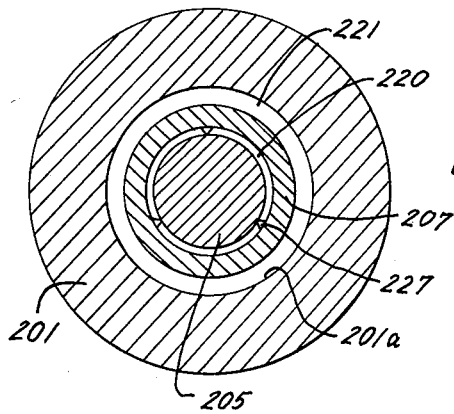
FIG. 5 is a transverse section as seen in the direction of arrows from the line V—V of FIG. 4.

FIGS. 4 and 5 illustrate a third embodiment of my invention which comprises a cylinder 201 having a coaxial bore 201a for a material conveying element 202 in the form of a screw which is movable (i.e. rotatable and axially shiftable) in the cylinder. As is well known in the art, the cylinder 201 is provided with customary heating coils and is connected to a suitable source of thermoplastic material, e.g. a hopper or the like.

The conveying element 202 comprises at its forward end an integral head including a frustoconical rear portion or rear stop means 206 having an inwardly and forwardly tapering conical rear stop face 213, a preferably cylindrical median portion 205 which is located at the downstream side of the rear portion 206 and which is coaxial with the cylinder 201, and a substantially conical forward portion or tip 204. The median portion 205 is surrounded by a second stop means in the form of a retaining ring 207 whose outer diameter is smaller than the diameter of the bore 201a and whose inner diameter is larger than the diameter of the median portion 205 so that the median portion and the cylinder 201 respectively define with the ring 207 annular passages 220, 221 through which the thermoplastic material may flow toward the forward portion 204 and to the mold, not shown.

Figure 6:
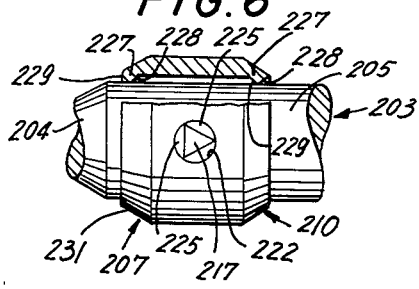
FIG. 6 is a side elevational view of the retaining ring and of the head which latter forms part of the conveying element, the retaining ring being partially broken away and the view of FIG. 6 being taken in the direction of the arrow VI in FIG. 4.

The retaining ring 207 has a preferably conical stop face 210 which tapers inwardly toward the axis of the cylinder 201 in a direction counter to the direction of material flow through the outer annular passage 221. As shown in FIGS. 4 and 6, the retaining ring is formed with a pair of transversely extending circular through bores 222, 223 which are aligned with each other and with a transversely extending circular through bore 224 provided in the median portion 205 of the head 203. The bores 222–224 receive a securing means in the form of a polygonal pin 217 which prevents or limits axial movements of the retaining ring 207 with respect to the head 203. As shown in FIG. 6, the triangular pin 217 and the walls of the through bores 222–224 define between themselves a plurality of transverse passages 225 which communicate with the annular passages 220, 221. The pin 217 may be rather loosely inserted into the bores 222–224 because it is held in position by thermoplastic material so that it is not likely to shift if it is held in horizontal position.

Figure 7:
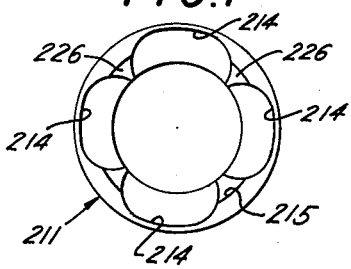
FIG. 7 is a front end view of the reflux eliminating annular member which is utilized in the machine of FIG. 4.

The injection molding machine of FIGS. 4 and 5 further comprises a reflux eliminating annular member 211 whose configuration is preferably identical with or similar to that of the annular member 11 or 111, and at least a portion of which again preferably consists of elastic material, e.g. spring steel or the like. The annular member 211 is slidably received in the bore 201a and its internal surface is formed with one or more cutouts so that the member 211 and the median portion 205 define between themselves a series of preferably uniformly spaced ducts 214 (see also FIG. 7) whose depth increases radially outwardly in a direction toward the retaining ring 207. The adjacent ducts 214 may communicate with each other because the smallest internal diameter of the member 211 preferably exceeds the diameter of the median portion 205. As shown in FIG. 4, the discharge ends of the ducts 214 extend radially outwardly and beyond the front sealing face 210. The annular member 211 is bounded by a conical front end face 215 and by a conical rear end face 212, the latter adapted to abut against the stop face 213 so as to prevent the flow of thermoplastic material from the threads 202a of the conveying element 202 into the ducts 214. It will be noted that the distance between the stop faces 210, 213 exceeds the distance between the conical end faces 215, 212 so that the annular member 211 is axially movable in the bore 201a between a foremost position (FIG. 4) in which the front end face 215 abuts against the front stop face 210 and a rearmost position in which the rear end face 212 abuts against the rear stop face 213. When the annular member 211 assumes its foremost position, thermoplastic material advanced by the threads 202a of the conveying element 202 may flow through the ducts 214 and through the passages 220, 221 toward the forward portion 204. When the rear end face 212 abuts against the rear stop face 213, the rear portion 206 of the head 203 causes the rear portion of the annular member 211 to expand into tight sealing engagement with the internal surface of the cylinder 201. Provided that the conveying element 202 is moved in the direction indicated in FIG. 4 by the arrow D and that the back pressure of thermoplastic material in the ducts 214 and at the downstream side of the ducts 214 prevails over the pressure of thermoplastic material at the upstream side of the ducts, the annular member forms with the rear portion 206 a perfect seal between the conveying element and the cylinder 201. In addition, and provided that the entire annular member consists of elastic material, the thermoplastic material filling the ducts 214 causes the remaining portion of the annular member to expand into sealing engagement with the internal surface of the cylinder, this being due to the fact that the ducts 214 are provided between the median portion 205 and the internal surface of the annular member.

If the pressure of thermoplastic material at the upstream side of the ducts 214 is higher than the pressure at the downstream side of these ducts, the annular member 211 is shifted into abutment with the retaining ring (FIG. 4) so that, in response to axial movement of the conveying element 202 in the direction of the arrow D, the material may flow through the discharge ends of the ducts 214 and through the passages 220, 221 toward the forward portion 204. In such foremost position of the annular member 211, only the front faces of the ribs 226 (see FIG. 7) of the member 211 which extend between the adjacent ducts 214 come into abutment with the front stop face 210.

The retaining ring 207 is formed with internal projections 227 which extend radially inwardly from its internal surface and preferably into a mere point contact with the periphery of the median portion 205. The projections 227 are arranged in two or more axially spaced groups, e.g. at the upstream and at the downstream sides of the pin 217, and the projections of each group are preferably uniformly spaced from each other. For example, the angular distance between the adjacent projections of each group may equal 120 degrees if each group comprises three projections (see FIG. 5). The projections 227 insure that the internal surface of the retaining ring 207 defines with the periphery of the median portion 205 the aforementioned inner annular passage 220 so that the material passing through the ducts 214 may flow through the outer passage 221 as well as through the inner passage 220. The pointed shape of the projections 227 insures that the material flowing through the passage 220 meets little resistance. It is preferred to utilize projections whose cross-sectional areas diminish gradually in a direction radially inwardly toward the median portion 205. In addition, each projection is preferably provided with a rear facet 228 which tapers in the same direction as the rear end face 212 or the rear stop face 213, as well as with a front facet 229 which tapers radially inwardly in the same direction as the front end face 215 or the front stop face 210.

As shown in FIG. 4, the bottom walls of the ducts 214 are inclined with respect to the front stop face 210 and with respect the front end face 215 so that the front portions of these ducts taper radially outwardly when the annular member 211 abuts against the retaining ring 207, i.e. the front portions of the ducts 214 then assume the form of wedges so that thermoplastic material flowing through the ducts tends to move the annular member 211 away from the retaining ring 207 and thereby reduces the force with which the front end face 215 bears against the front stop face 210. It will be seen that the inclination of the bottom walls in the ducts 214 is less than the inclination of the faces 210, 215.

The construction of the injection molding machine shown in FIG. 4 is preferably such that the effective cross-sectional area of the ducts 214 in the foremost position of the member 211 equals the cross-sectional area of the channel defined by the foremost external thread 202a of the conveying element 202 with the internal surface of the cylinder 201. This insures uniform flow of thermoplastic material toward the forward portion 204. Also, the retaining ring 207 is then subjected to negligible axial pressure so that it may be loosely supported on the median portion 205, e.g. with a clearance in the range of 1 mm. In fact, when the material flows through the inner annular passage 220, the retaining ring is actually lifted away from contact with the median portion and floats between the cylinder and the conveying element. The provision of facets 228, 229 also contributes to such lifting effect of thermoplastic material upon the retaining ring. The thermoplastic material is indicated by dots and is identified in FIG. 4 by the reference numeral 230.

Owing to such floating of the retaining ring 207 between the median portion 205 and the internal surface of the cylinder 201, the material 230 cannot stagnate in the passage 220 or in the transversely extending passages 225. This is due to the fact that there is always at least some flow of material 230 transversely through the bores 222–2224. As stated before, the pin 217 need not even be fastened in the through bores 222–224 because it is held in requisite position by thermoplastic material so as to secure the ring 207 to the median portion 205. It was found that the uniform pressure of material filling the bore 201a at the downstream side of the head 203 contributes to retention of the pin 217 in the through bores 222–224. The surprising phenomenon that the material 230 meets little resistance not only while flowing through the outer passage 221 but also while flowing through the inner passage 220 and through the passage 225 was confirmed by a series of experiments, and it was found that a new supply of differently colored thermoplastic material or a new supply of thermoplastic material with one or more different ingredients will automatically and rapidly expel all traces of previously treated thermoplastic material so that no traces of previously treated material will remain in the zone between the foremost thread 202a and the front end of the retaining ring 207. As shown in FIGS. 4 and 6, the front end of the retaining ring is preferably provided with a forwardly and inwardly tapering external face 231 along which the material passing through the outer passage 221 flows toward the forward portion 204.

Any thermoplastic material which remains in the cylinder 1, 101 or 201 upon completion of an injection molding operation and prior to the next operation with a different thermoplastic material may adversely affect the strength characteristics and/or the appearance of subsequently molded articles. On the one hand, the high temperatures prevailing in the cylinder decompose the remnants of thermoplastic material so that the material is liquefied and is subsequently entrained into the mold by a new batch of material. This affects the quality of the molded articles which is particularly undesirable when the articles must possess high strength characteristics in each of their zones or if the configuration of the articles is such that certain of their portions can be broken off if the connection between such portions and the main parts of the molded articles is weakened by the presence of decomposed thermoplastic material. On the other hand, if all remnants of thermoplastic material utilized in a preceding operation are not removed from the cylinder, and if the next batch of material passing through the cylinder contains a different coloring substance, undesirable combinations of colors will be observable in the finished products. It is also likely that certain components of a first batch of thermoplastic material will react with certain components of the next batch so as to transform the next batch into a substance which is not satisfactory for injection molding of certain types of articles. The dismantling of the machine is a tedious operation and should be avoided if possible in order to eliminate lengthy interruptions in the use of the injection molding machine. Also, large quantities of material are wasted when the machine is taken apart so that the arrangement of my invention constitutes a substantial improvement because it not only eliminates lengthy interruptions in operation but also because it brings about savings in mateial since the preceding batch of material may be completely or substantially completely expelled from the cylinder by the next batch.

It has been found that, though the penetration of thermoplastic material between the head 3 and the stop means 7 or between the head 103 and the stop means 107 is reduced to a minimum, under certain circumstances very small quantities of thermoplastic material might penetrate between these parts so that at least some decomposition or discoloration of thermoplastic material may take place from time to time. Such penetration is due mainly to expansion of the stop means 7 or 107 under the action of heat at elevated temperatures which prevail in the cylinder. It is well known that the material should be conveyed through the cylinder at temperatures which are only slightly below the decomposition temperature.

The injection molding machine of FIG. 4 constitutes an improvement over the machines of FIGS. 1 and 3 in that, quite surprisingly, the retention of thermoplastic material in the passages 220-224 is reduced to zero so that the next batch of thermoplastic material completely expels all remnants of the preceding batch and thus automatically cleans the interior of the cylinder 201. This reduces the wear on the component parts of the machine, such as results from frequent dismantling and assembling, and the losses in thermoplastic material are reduced well below such losses which are incurred when the machine is taken apart for the purpose of cleaning. Of course, additional savings are achieved due to the fact that the machine need not be taken apart so that the changeover from operation with one type of material to operation with another material can take place substantially without any interruption.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be protected by Letters Patent is:

1. In an injection molding machine for thermoplastic material, in combination, a cylinder having a bore; a material conveying element movably received in said bore for advancing the material through said cylinder, said conveying element having a rear stop face and a front stop face spaced from and located at the downstream side of said rear stop face; and a reflux eliminating annular member slidably received in said bore intermediate said stop faces, said annular member having an internal surface defining with said conveying element at least one duct for the material, a rear end face adapted to abut against said rear stop face so as to prevent the flow of material to said duct, and a front end face adapted to abut against said front stop face, the distance between said stop faces exceeding the distance between said end faces and at least a portion of said annular member consisting of elastically deformable material so that the annular member may expand into tight sealing engagement with said cylinder in response to increasing pressure of thermoplastic material in said bore and said duct.

2. In an injection molding machine for thermoplastic material, in combination, a cylinder having a bore; a material conveying element movably received in said bore for advancing the material through said cylinder, said conveying element having a conical rear stop face tapering inwardly toward the axis of said cylinder in the direction of material flow and an oppositely inclined conical front stop face spaced from and located at the downstream side of said rear stop face; a reflux eliminating annular member slidably received in said bore intermediate said stop faces, said annular member having an internal surface defining with said conveying element at least one duct for thermoplastic material, a conical rear end face adapted to abut against said rear stop face to prevent the flow of material to said duct, and an oppositely inclined conical front end face adapted to abut against said front stop face, said duct having a discharge end extending radially outwardly beyond said front stop face so that the material may flow through said duct and beyond said front stop face when the latter abuts against said front end face, the distance between said stop faces exceeding the distance between said end faces and said annular member consisting of hard elastic material so that said annular member may expand into tight sealing engagement with said cylinder in response to increasing pressure of thermoplastic material in said bore and said duct.

3. In an injection molding machine for thermoplastic material, in combination, a cylinder having a bore; a material conveying element having a forward end and movably received in said bore for advancing the material through said cylinder; a head having a rear portion secured to said forward end, a median portion, and a forward portion, said forward portion and said median portion defining between themselves a conical stop face tapering inwardly in a direction counter to the direction of material flow; an annulus adjacent to the forward end of said conveying element and having a conical stop face tapering inwardly in the direction of material flow, said stop faces spaced from each other; and a reflux eliminating annular member slidably received in said bore intermediate said stop faces, said annular member having an internal surface defining with said median portion at least one duct through which the material may flow toward said forward portion, a conical rear end face of an inclination similar to and adapted to abut against the sealing face of said annulus to prevent the flow of material into said duct, and an oppositely inclined conical front end face adapted to abut against said first mentioned stop face, said duct having a discharge end extending radially outwardly beyond said first mentioned stop face so that the material entering said duct may flow toward and beyond said forward portion when said front end face abuts against said first mentioned stop face, the distance between said stop faces exceeding the distance between said end faces and said ring consisting of elastic material so that it may expand into sealing engagement with said cylinder in response to increasing pressure of thermoplastic material in said bore and said duct.

4. A combination as set forth in claim 3, wherein the rear portion of said head is screwed into the forward end of said conveying element and the forward portion of said head is of bulbose shape.

5. A combination as set forth in claim 3, wherein the thickness of said annular member diminishes in a direction from the rear toward the front end face thereof.

6. A combination as set forth in claim 3, wherein the elasticity of said annular member is such that its portion adjacent to said rear end face expands when the annular member abuts against the stop face of said annulus and the back pressure of material in said duct increases.

7. A combination as set forth in claim 3, wherein said median portion and said annular member define between themselves a plurality of uniformly spaced ducts.

8. In an injection molding machine for thermoplastic material, in combination, a cylinder having a bore; a material conveying element movably received in said bore for advancing the material through said cylinder and comprising a head including a forward portion, a median portion and a rear portion, said rear portion having a first stop face; a ring member sealingly surrounding and fixed to said median portion, said ring member having a second stop face spaced from said first stop face; and a reflux eliminating annular member slidably received in said bore intermediate said stop faces, said annular member having an internal surface defining with said median portion at least one duct through which the material may flow toward said forward portion, a rear end face adapted to abut against said first stop face so as to prevent the flow of material into said duct, and a front end face adapted to abut against said second stop face, said duct having a discharge end extending radially outwardly beyond said ring member so that the material entering said duct may flow toward and beyond said ring member when said front end face abuts against said second stop face, the distance between said stop faces exceeding the distance between said end faces and at least a portion of said annular member consisting of elastic material so that said annular member may expand into sealing engagement with said cylinder in response to increasing pressure of thermoplastic material in said bore and said duct.

9. A combination as set forth in claim 8, wherein said median portion is of cylindrical shape.

10. A combination as set forth in claim 8, wherein said median portion is of conical shape and tapers inwardly toward the forward portion of said head.

11. A combination as set forth in claim 8, wherein said head is integral with said conveying element.

12. A combination as set forth in claim 8, wherein said stop faces and said end faces are of conical shape, said rear end face and said first stop face tapering inwardly in the direction of material flow, said front end face and said second stop face tapering in the opposite direction.

13. A combination as set forth in claim 8, wherein said ring member and the forward portion of said head constitute a composite body of bulbose shape.

14. A combination as set forth in claim 8, comprising at least one pin extending through said median portion and through said ring member in a direction substantially perpendicular to the axis of said cylinder for fixing said ring member to said head.

15. In an injection molding machine, in combination, a cylinder having a bore; a material conveying element movably received in said bore for advancing the material through said cylinder; spaced front and rear stop means on said element; and a reflux eliminating annular member of hard, elastic material slidably received in said bore, said annular member axially movable between said stop means and defining with said conveying element at least one internal duct for the flow of thermoplastic material in a direction from said rear stop means toward said front stop means, said annular member having a rear end face adapted to sealingly engage with the rear stop means and a front end face adapted to abut against the front stop means, at least that portion of the annular member which is adjacent to its front end face being of reduced thickness so that the annular member may expand under back pressure of thermoplastic material into sealing engagement with said cylinder to prevent reflux of thermoplastic material along the cylinder when the annular member abuts against said rear stop means.

16. In an injection molding machine for thermoplastic material, in combination, a cylinder having an internal surface; a material conveying element movably received in and defining with the internal surface of said cylinder an annular passage for thermoplastic material; and a reflux eliminating annular member of hard elastic material mounted on said conveying element, said annular member movable with respect to said conveying element between a rearmost position in which it seals said passage and a foremost position in which it permits thermoplastic material to flow through said passage, said annular member having a front end and at least a portion thereof adjacent to said front end consisting of at least slightly elastic material whereby said annular member expands into sealing contact with the internal surface of said cylinder under the back pressure of thermoplastic material contained between said annular member and said conveying element when the annular member is in said rearmost position so that the annular member prevents bleeding of thermoplastic material thereabout.

17. In an injection molding machine for thermoplastic material, in combination, a cylinder having a bore; a material conveying element movably received in said bore for advancing the material through said cylinder, said conveying element having a conical stop face tapering toward the axis of said cylinder in the direction of material flow and a median portion at the downstream side of said stop face; a reflux eliminating annular member slidably received in said bore and having an internal surface defining with said median portion at least one duct for thermoplastic material, a conical rear face adapted to abut against said stop face so as to prevent the flow of thermoplastic material into said duct, and a front end face; a retaining ring disposed about said median portion at the downstream side of said annular member and having a stop face adjacent to said front end face, the distance between said stop faces exceeding the distance between said end faces and at least a portion of said annular member consisting of elastic material so that the annular member may expand into sealing engagement with said cylinder in response to increasing pressure of thermoplastic material in said bore and said duct, said retaining ring defining with said median portion an annular passage through which at least some thermoplastic material discharged from said duct may flow; and means for securing said ring to said median portion.

18. In an injection molding machine for thermoplastic material, in combination, a cylinder having a bore; a material conveying element movably received in said bore for advancing the material through said cylinder, said conveying element having a conical stop face tapering toward the axis of said cylinder in the direction of material flow and a median portion at the downstream side of said stop face; a reflux eliminating annular member slidably received in said bore and having an internal surface defining with said median portion at least one duct for thermoplastic material, a conical rear face adapted to abut against said stop face so as to prevent the flow of thermoplastic material into said duct, and a front end face; a retaining ring disposed about said median portion at the downstream side of said annular member and having a stop face adjacent to said front end face, the distance between said stop faces exceeding the distance between said end faces and at least a portion of said annular member consisting of elastic material so that the annular member may expand into sealing engagement with said cylinder in response to increasing pressure of thermoplastic material in said bore and said duct, said retaining ring respectively defining with said cylinder and with said median portion a first and a second annular passage through which the material discharged from said duct may flow; and means for securing said ring to said median portion.

19. In an injection molding machine for thermoplastic material, in combination, a cylinder having a bore; a material conveying element movably received in said bore for advancing the material through said cylinder, said conveying element having a conical stop face tapering toward the axis of said cylinder in the direction of material flow and a median portion at the downstream side of said stop face, said median portion having a transversely extending through bore; a reflux eliminating annular member slidably received in said bore and having an internal surface defining with said median portion at least one duct for thermoplastic material, a conical rear face adapted to abut against said stop face so as to prevent the flow of thermoplastic material into said duct, and a front end face; a retaining ring disposed about said median portion at the downstream side of said annular member and having a stop face adjacent to said front end face, the distance between said stop faces exceeding the distance between said end faces and at least a portion of said annular member consisting of elastic material so that the annular member may expand into sealing engagement with said cylinder in response to increasing pressure of thermoplastic material in said bore and said duct, said retaining ring defining with said median portion an annular passage through which at least some thermoplastic material discharged from said duct may flow and said ring having at least one through bore aligned with said first mentioned through bore; and a pin received in said through bores for securing said ring to said median portion, said ring and said median portion defining with said pin a plurality of transversely extending passages communicating with said annular passage.

20. A combination as set forth in claim 19, wherein said pin is of polygonal cross section and said through bores are of circular contour.

21. A combination as set forth in claim 19, wherein said pin is loosely received in said through bores.

22. In an injection molding machine for thermoplastic material, in combination, a cylinder having a bore; a material conveying element movably received in said bore for advancing the material through said cylinder, said conveying element having a conical stop face tapering toward the axis of said cylinder in the direction of material flow and a median portion at the downstream side of said stop face; a reflux eliminating annular member slidably received in said bore and having an internal surface defining with said median portion at least one duct for thermoplastic material, a conical rear face adapted to abut against said stop face so as to prevent the flow of thermoplastic material into said duct, and a front end face; a retaining ring disposed about said median portion at the downstream side of said annular member and having a stop face adjacent to said front end face, the distance between said stop faces exceeding the distance between said end faces and at least a portion of said annular member consisting of elastic material so that the annular member may expand into sealing engagement with said cylinder in response to increasing pressure of thermoplastic material in said bore and said duct, said retaining ring defining with said median portion an annular passage through which at least some thermoplastic material discharged from said duct may flow; a plurality of internal projections provided on said ring and in point contact with said median potrion; and means for securing said ring to said median portion.

23. A combination as set forth in claim 22, wherein said internal projections are angularly spaced through substantially 120 degrees from each other.

24. A combination as set forth in claim 22, wherein the cross sections of said projections diminish radially inwardly toward said median portion.

25. A combination as set forth in claim 22, wherein said projections are arranged in at least two axially spaced circular groups and the projections of one of said groups are axially aligned with the projections of the other group.

26. A combination as set forth in claim 22, wherein said projections have rear facets tapering inwardly toward the axis of said cylinder in a direction counter to the direction in which the thermoplastic material flows.

27. A combination as set forth in claim 22, wherein said projections have front facets inclined inwardly toward the axis of said cylinder and counter to the direction in which the thermoplastic material flows.

28. In an injection molding machine for thermoplastic material, in combination, a cylinder having a bore; a material conveying element movably received in said bore for advancing the material through said cylinder, said conveying element having a conical stop face tapering toward the axis of said cylinder in the direction of material flow and a median portion at the downstream side of said stop face; a reflux eliminating annular member slidably received in said bore and having an internal surface defining with said median portion at least one duct for thermoplastic material, a conical rear face adapted to abut against said stop face so as to prevent the flow of thermoplastic material into said duct, and a front end face; a retaining ring disposed about said median portion at the downstream side of said annular member and having a stop face adjacent to said front end face, the distance between said stop faces exceeding the distance between said end faces and at least a portion of said annular member consisting of elastic material so that the annular member may expand into sealing engagement with said cylinder in response to increasing pressure of thermoplastic material in said bore and said duct, said retaining ring respectively defining with said cylinder and with said median portion a first and a second annular passage through which the thermoplastic material discharged from said duct may flow; a plurality of internal projections provided on said ring and extending inwardly into close proximity of said median portion so that the ring is mounted with slight radial play on said median portion; and means for securing said ring to said median portion.

29. In an injection molding machine for thermoplastic material, in combination, a cylinder having a bore; a material conveying element movably received in said bore for advancing the material through said cylinder, said conveying element having a conical stop face tapering toward the axis of said cylinder in the direction of material flow and a median portion at the downstream side of said stop face; a reflux eliminating annular member slidably received in said bore and having an internal surface defining with said median portion at least one duct for thermoplastic material, a conical rear face adapted to abut against said stop face so as to prevent the flow of thermoplastic material into said duct, and an oppositely inclined conical front end face, said duct having a bottom wall tapering inwardly and counter to the direction of material flow, the inclination of said front end face exceeding the inclination of said bottom wall; a retaining ring disposed about said median portion at the downstream side of said annular member and having a conical stop face adjacent to and of an inclination similar to that of said front end face, the distance between said stop faces exceeding the distance between said end faces and at least a portion of said annular member consisting of elastic material so that the annular member may expand into sealing engagement with said cylinder in response to increasing pressure of thermoplastic material in said bore and said duct, said retaining ring defining with said median portion an annular passage through which at least some thermoplastic material discharged from said duct may flow; and means for securing said ring to said median portion.

30. In an injection molding machine for thermoplastic material, in combination, a cylinder having a bore; a material conveying element movably received in said bore for advancing the material through said cylinder and comprising thread means including a foremost thread defining with said cylinder a channel through which the thermoplastic material may be caused to flow by said conveying element, said conveying element having a conical stop face tapering toward the axis of said cylinder in the direction of material flow and a median portion at the downstream side of said stop face; a reflux eliminating annular member slidably received in said bore and having an internal surface defining with said median portion at least one duct for thermoplastic material, a conical rear face adapted to abut against said stop face so as to prevent the flow of thermoplastic material into said duct, and a front end face, the effective cross-sectional area of said duct when the annular member is spaced from said stop face at least approximating the cross sectional area of said channel; a retaining ring disposed about said median portion at the downstream side of said annular member and having a stop face adjacent to said front end face, the distance between said stop faces exceeding the distance between said end faces and at least a portion of said annular member consisting of elastic material so that the annular member may expand into sealing engagement with said cylinder in response to increasing pressure of thermoplastic material in said bore and said duct, said retaining ring defining with said median portion an annular passage through which at least some thermoplastic material discharged from said duct may flow; and means for securing said ring to said median portion.

31. In an injection molding machine for thermoplastic material, in combination, a cylinder having a bore; a material conveying element movably received in said bore for advancing the material through said cylinder, said conveying element having a stop face and a portion located downstream of said stop face as seen in the direction in which the material flows through said bore; a reflux eliminating annular member slidably received in said bore and having an internal surface defining with said portion at least one duct for thermoplastic material, a rear end face adapted to abut against said stop face so as to prevent entry of thermoplastic material into said duct, and a front end face; a retaining ring disposed about said portion and having a stop face adjacent to the front end face of said annular member, the distance between said stop faces exceeding the distance between said end faces so tha the rear end face of the annular member is spaced from the stop face of said conveying element when said front end face abuts against the stop face of said ring, said ring defining with said portion an annular passage through which at least some thermoplastic material may flow when said rear end face is spaced from the stop face of said conveying element; and means for floatingly securing said ring to said portion.

32. In an injection molding machine for thermoplastic material, in combination, a cylinder having a bore; a reflux eliminating annular member slidably received in said bore and having a front portion and a rear portion; a material conveying element received in said cylinder, said conveying element comprising stop means for said rear portion and a reduced portion extending through said annular member, said reduced portion and said annular member defining between themselves at least one duct through which the material may flow when said rear portion is spaced from said stop means; a retaining ring disposed between said cylinder and said reduced portion and having stop means for the front portion of said annular member, the distance between said stop means being such that said front portion is spaced from said ring when said rear portion engages the stop means of said conveying element and vice versa, said ring respectively defining with said cylinder and with said reduced portion first and second passages through which the material may flow when said rear portion is spaced from the stop means of said conveying element; and connecting means for detachably securing said ring to said conveying element.

References Cited in the file of this patent
UNITED STATES PATENTS

| | | |
|---|---|---|
| 2,616,130 | Banz | Nov. 4, 1952 |
| 2,885,734 | Waucher | May 12, 1959 |

FOREIGN PATENTS

| | | |
|---|---|---|
| 211,029 | Australia | Oct. 24, 1957 |
| 581,229 | Italy | Aug. 23, 1958 |